Sept. 29, 1936.   C. F. HANSEN ET AL   2,055,821
PROCESS FOR MANUFACTURING CORD COMPOSED OF TEXTILE THREADS AND RUBBER
Filed July 14, 1933
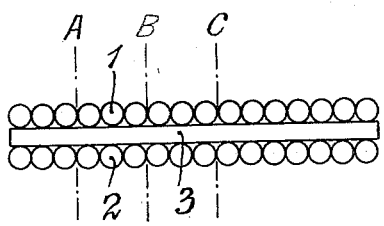
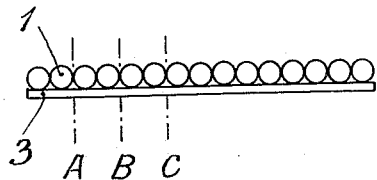
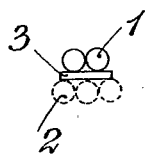

Patented Sept. 29, 1936

2,055,821

UNITED STATES PATENT OFFICE 2,055,821

PROCESS FOR MANUFACTURING CORD COMPOSED OF TEXTILE THREADS AND RUBBER

Caspar Fredrik Hansen, Oslo, and Erling Meier, Skoyen, near Oslo, Norway

Application July 14, 1933, Serial No. 680,452
In Germany July 19, 1932

2 Claims. (Cl. 154—2)

The present invention relates to the type of cords which are composed of parallel textile threads and a core of rubber.

In accordance with the present invention the cord consists of several superimposed layers of parallel textile threads and rubber, said layers being so chosen that the cord is given a quadrangular cross section, having two opposed surfaces composed of parallel textile threads, whereas the two other surfaces are composed of alternate strips of textile threads and rubber.

A cord of this type when used for the production of rubber impregnated textile fabrics has the advantage that the rubber can easily be squeezed out on the two sides of the cord during the pressing and vulcanization process, so as to fill out the free spaces remaining between the cords after the weaving operation.

In accordance with the present invention the cord may be produced by tearing or cutting a material comprising a sheet of rubber covered with parallel textile cords on one side into strips of suitable breadth, each strip comprising 2 or 3 parallel textile threads, whereupon the rubber surface of said strips is covered with parallel textile threads, the total breadth of which is slightly larger than the total breadth of the threads adhering to the strip.

In this manner a cord is produced having a trapezoid cross section, the two parallel side surfaces of the cord being covered with closely adjacent parallel textile threads, whereas the intermediate layer of rubber opens freely near the middle of the two converging side surfaces.

The advantage in making the cord in this manner consists therein that the cord so produced is smoother and accordingly is easier to handle in the weaving operation owing to the fact that the rubber layer on one side is covered by a somewhat broader layer composed of textile threads.

Cords in accordance with the present invention may also comprise more than three layers, e. g. two outside and one middle layer of textile threads and two layers of rubber on each side of the middle layer of textile threads. It should be noted that the two exterior layers should always be composed of textile threads. Of course uncured rubber is used in the core, vulcanization taking place after the resulting cord has been woven into fabric or the like.

On the drawing Figure 1 illustrates a cross section through a material comprising two outside layers of textile threads 1 and 2 and an intermediate layer 3 of rubber. In order to produce cords of this material the latter is torn or cut e. g. as indicated by the dotted lines A, B, C, whereby cords are produced having two parallel exterior surfaces, each composed of three parallel textile threads, the intermediate layer of rubber being uncovered on the two other sides of the cord.

Figure 2 illustrates a cross section through a cord material, one side of which is composed of parallel textile threads 1, the other side being formed by a layer 3 of rubber. By cutting this material as indicated by the lines A, B, C, strips are obtained of the kind indicated in full lines on Figure 3, one side of the strip being composed of two parallel textile threads and the other side of a layer of rubber. The rubber side of said strip is covered in accordance with the invention with three textile threads 2, as indicated in dotted lines on Figure 3, whereby a cord is obtained having a trapezoid cross section and a reasonably smooth surface, although the rubber can easily be squeezed out on the side surfaces during the pressing and vulcanization operation.

We claim:

1. A method for manufacturing composite cords comprising the cutting of a cord material composed of a sheet of rubber covered with parallel textile threads in narrow strips, each comprising a number of parallel textile threads and a strip of rubber and covering the free surface of the rubber strip with a cover of parallel textile threads, the total breadth of which is somewhat in excess of the total breadth of the textile threads on the opposite side of the rubber strip.

2. A method of manufacturing composite cords of textile threads and rubber, comprising the cutting of a cord material composed of a sheet of rubber covered with parallel textile threads in narrow strips, each comprising a number of parallel textile threads and a strip of rubber and covering the free surface of the rubber strip with a cover of parallel textile threads, so as to obtain a cord with quadrangular cross section having two exterior parallel side surfaces formed of parallel textile threads and two other surfaces formed with alternate strips of rubber and textile threads.

ERLING MEIER.
CASPAR FREDRIK HANSEN.